(12) United States Patent
Cano et al.

(10) Patent No.: US 6,222,007 B1
(45) Date of Patent: Apr. 24, 2001

(54) FILMS, PREIMPREGNATED TAPES AND COMPOSITES MADE FROM POLYIMIDE "SALT-LIKE" SOLUTIONS

(75) Inventors: Roberto J. Cano, Yorktown; Erik S. Weiser, Newport News; Terry L. St. Clair, Poquoson, all of VA (US); Yoshiaki Echigo; Hisayasu Kaneshiro, both of Kyoto (JP)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/093,826

(22) Filed: May 29, 1998

(51) Int. Cl.$^7$ ..................................... C08G 73/10
(52) U.S. Cl. ......................... 528/353; 528/125; 528/128; 528/172; 528/173; 528/179; 528/188; 528/220; 528/229; 528/350; 428/395; 428/411.1; 428/473.5; 264/45.1; 264/165; 264/170; 264/171.1; 264/171.21; 264/331.11; 264/331.12; 264/331.21
(58) Field of Search ..................................... 528/353, 125, 528/128, 188, 179, 172, 173, 220, 229, 350; 428/411.1, 473.5, 395; 264/331.11, 331.12, 331.21, 45.1, 165, 170, 171.1, 171.21

(56) References Cited

U.S. PATENT DOCUMENTS

| | | | |
|---|---|---|---|
| 4,311,661 | 1/1982 | Palmer | 264/510 |
| 4,683,099 | 7/1987 | Buxton et al. | 264/511 |
| 4,855,391 | 8/1989 | Berdahl et al. | 528/188 |
| 5,070,181 | * 12/1991 | Kawai et al. | 528/188 |
| 5,077,382 | * 12/1991 | Meterko et al. | 528/353 |
| 5,147,966 | * 9/1992 | St. Clair et al. | 528/188 |
| 5,464,928 | * 11/1995 | Chang et al. | 528/188 |
| 5,478,913 | * 12/1995 | Boyce et al. | 528/188 |
| 5,478,916 | * 12/1995 | Chang et al. | 528/188 |
| 5,478,917 | 12/1995 | Blum et al. | 528/353 |

* cited by examiner

*Primary Examiner*—P. Hampton-Hightower

(57) ABSTRACT

High quality films, preimpregnated tape (prepegs) and composites have been fabricated from polyimide precursor "salt-like" solutions. These "salt-like" solutions have a low viscosity (5,000 to 10,000 cp) and a high solids content (50–65% by weight) and can be coated onto reinforcing fiber to produce prepegs with excellent tack and drape at 12–15% residual solvent (~4–6% water from thermal imidization reaction). The processing of these types of prepegs significantly overcomes solvent removal problems and allows excellent fiber wet out. In addition, the physical characteristics of the polyimide precursor "salt-like" solutions permits processing into high-performance materials through the use of standard prepregging and composite fabrication equipment. The resultant composites are of high quality.

17 Claims, 6 Drawing Sheets

FILMS, PREIMPREGNATED TAPES AND COMPOSITES MADE FROM POLYIMIDE "SALT-LIKE" SOLUTIONS

ORIGIN OF THE INVENTION

The invention described herein was jointly made by employees of the United States Government and employees of Unitika Ltd., in the performance of work under NASA MOA, SAA #385.

BACKGROUND OF THE INVENTION

Polyimides are heterocyclic polymers commonly synthesized by the condensation reaction of aromatic diamines with aromatic dianhydrides, or derivatives thereof, in various solvents. The initial reaction between the diamine and the dianhydride yields a polyamic acid which upon heating imidizes to the polyimide. A schematic of the synthetic process is given in FIG. 1. These materials exhibit a variety of desirable properties such as high temperature and solvent resistance, high modulus, and improved flow for better wetting and bonding in the fabrication of composites. These advantageous properties of polyimides have lead to their use as matrix resins, molding powders and films. In addition, high performance polyimides are used in the aerospace industry, for example, in the manufacture of lighter and stronger aircraft and space structures as well as in joining metals to metals, or metals to composite structures.

The synthesis and characterization of polyimides has been extensively studied and documented. Reviews on polyimides are available [J. W. Verbicky, Jr., "Polyimides" in Encyclopedia of Polymer Science and Engineering, $2^{nd}$ Ed., John Wiley and Sons, New York, Vol. 12, 364 (1988); C. E. Sroog, Prog. Polym. Sci., 16, 591 (1991)]. Many of these polyimides can be melt processed into various useful forms such as coatings, adhesives, composite matrix resins and films. The use of anhydrides as endcapping agents to control the molecular weight of the polymer and, in turn, to make them easier to process in the molten form has also been disclosed [U.S. Pat. No. 5,147,966 (St. Clair, et al.) and U.S. Pat. No. 5,478,916 (St. Clair, et al.)].

Current technology for making preimpregnated tape (prepeg) and composites from polyimides entails the processing of the polyamic acid solution with the reinforcing fibers. These polyamic acid solutions have a high viscosity and low solids content. In general, the solutions are prepared at solid contents of 25 to 35% by weight with resulting Brookfield viscosities of 15,000 to 35,000 cp at 20° C. Consequently, the processing of these types of prepegs requires overcoming significant problems such as solvent management and good fiber wet out from the high viscosity solutions. Frequently, the resultant prepegs require residual solvent contents of 20 to 25% by weight (~2–3% water from thermal imidization reaction) for adequate tack and drape. This residual solvent must then be removed during the composite cure cycle. Typically, solvent removal is accomplished by holding the material at an intermediate drying temperature, above the boiling temperature of the solvent, for extended periods of time (i.e., one to two hours) under full vacuum, 30" Hg. The material is then ramped to a final cure temperature to ensure complete fiber wet-out and full consolidation.

The need for a process to produce high temperature polyimides into composites with less solvent is apparent. The hazards and expense of solvent removal and recovery are critical to the composite technology. A process which utilizes significantly less solvent and results in a higher quality intermediary and end-product is key to the use of these polyimide systems in large quantities. A primary requirement for such prepegs is that they have adequate wet out, proper fiber aerial weight, proper resin content, tack, drape, and low solvent content. These parameters are critical in the manufacture of composites from prepegs. Composites manufactured from these materials are vital in any application which requires elevated temperature use with weight constraints.

It is a primary object of the present invention to provide novel film, preimpregnated tape and composites manufactured from polyimide "salt-like" solutions with enhanced flow, tack, and drape in addition to high solids content and low residual volatiles.

Another object of the present invention is to provide novel polyimide "salt-like" solutions with physical characteristics that permit processing into high-performance materials through the use of standard prepregging and composite fabrication equipment. The utilization of these novel polyimide "salt-like" solutions permits the employment of significantly less solvent and results in higher quality preimpregnated tape.

SUMMARY OF THE INVENTION

According to the present invention the forgoing and additional objects are obtained by fabricating films and preimpregnated tapes from "salt-like" solutions of high temperature polyimides. The preimpregnated tapes can then be used to make composites. The polyimide "salt-like" solutions are formed from the reaction of a dianhydride dissolved in a mixture of solvent and alcohol at room temperature. This solution is treated at 60° C. for 3 hours in order to convert the dianhydride into a diester-diacid. Phthalic acid (PA) and a diamine are added to the diester-diacid solution and the mixture is stirred for 2 hours to yield a homogenous polyimide precursor "salt-like" solution. Likewise, similar polyimide "salt-like" resins can be formed from tetraacids and diamines mixed in different solvents and alcohols.

These "salt-like" solutions have a low viscosity (5,000 to 9,700 cp) and a high solids content (50–65% by weight) and can be coated onto reinforcing fiber to produce high quality prepegs with excellent tack and drape at 12–15% residual solvent (~4–6% water from thermal imidization reaction). Composites from these prepegs are of high quality and require significantly less solvent removal. Typically, low drying temperatures and only partial vacuum are required.

BRIEF DESCRIPTION OF THE DRAWINGS

For a more complete understanding of the present invention, including its objects and attending benefits, reference should be made to the Description of the Preferred Embodiments, which is set forth in detail below. This Detailed Description should be read together with the accompanying drawings, wherein.

DESCRIPTION OF THE PREFERRED EMBODIMENTS

Figure 1:
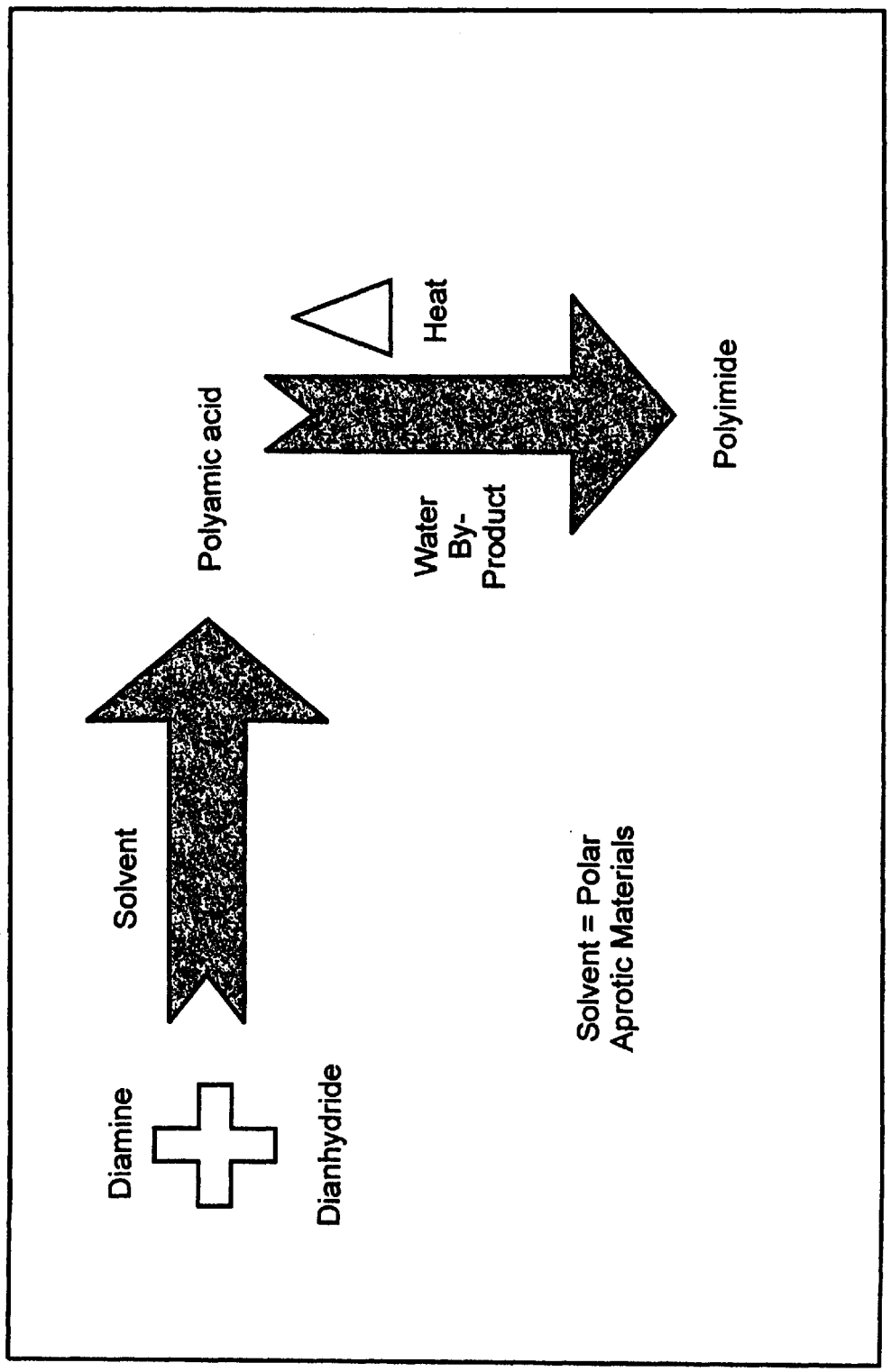
FIG. 1 is a general equation showing the synthesis of polyimides.
Figure 2:
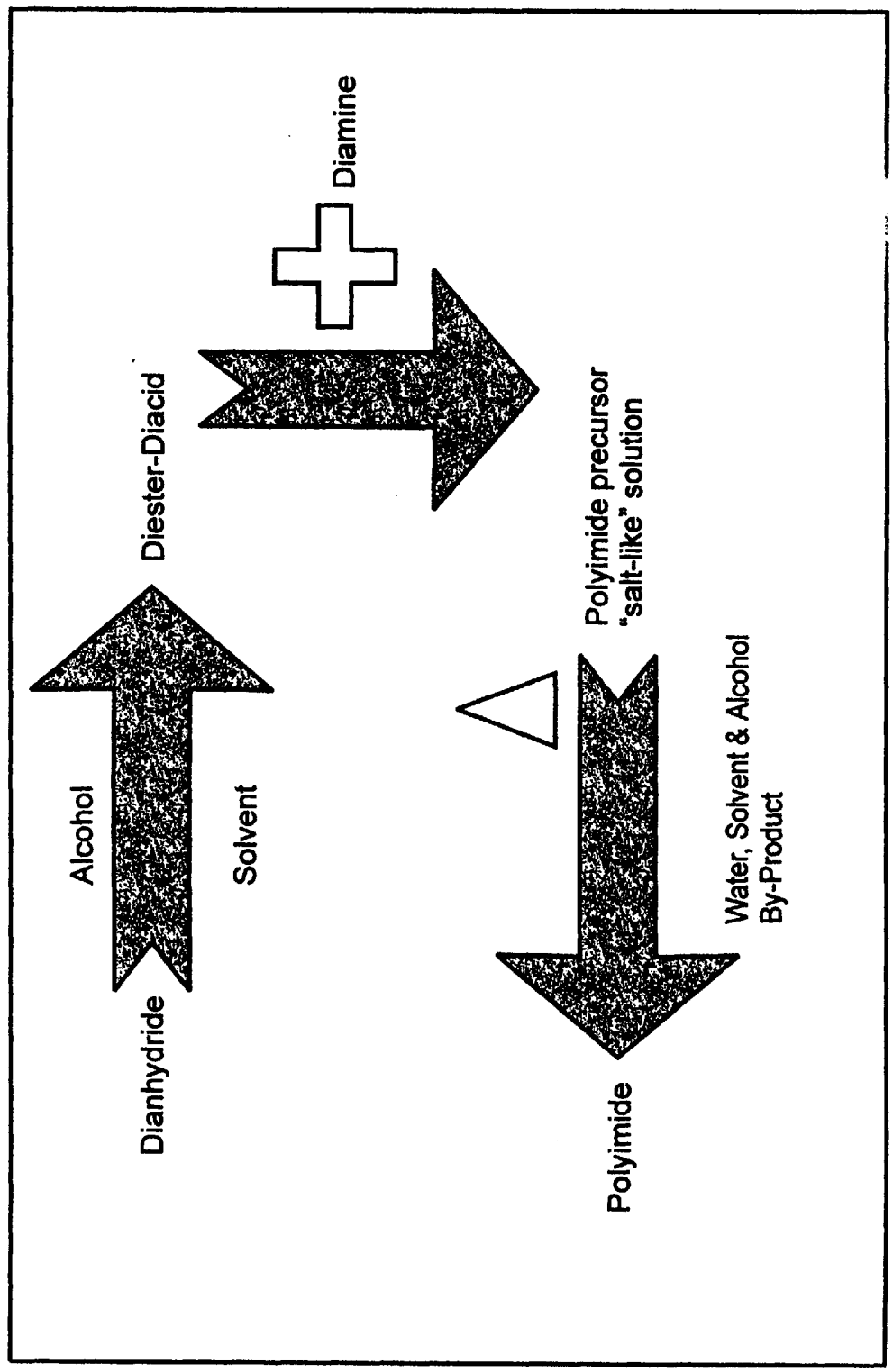
FIG. 2 is a general equation showing the synthesis of polyimide "salt-like" resins.

Films, preimpregnated tapes (prepegs) and composites are fabricated from "salt-like" solutions of high temperature polyimides. The polyimide "salt-like" solutions are formed from the reaction of a dianhydride dissolved in a mixture of solvent and alcohol at room temperature. This solution is treated at 60° C. for 3 hours in order to convert the dianhydride into a diester-diacid. Phthalic acid (PA) and a diamine are added to the resulting diester-acid solution and the mixture is stirred for 2 hours to yield a homogenous polyimide precursor "salt-like" solution. Likewise, polyimide "salt-like" resins can be formed from tetraacids and diamines mixed in different solvents and alcohols. These polyimide precursor "salt-like" solutions have a low viscosity (5,000 to 9,700 cp) and a high solids content (50–65% by weight) and are coated onto reinforcing fiber to produce high quality prepegs with excellent tack and drape at 12–15% residual solvent (~4–6% water from thermal imidization reaction). Composites from these prepegs are of high quality and require significantly less solvent removal.

In one aspect, the present invention is films, preimpregnated tapes and composites fabricated from polyimide precursor "salt-like" solutions having high solids content (50–80%), low residual volatiles (12–15%), and low viscosity (5,000 to 10,000 cp) at ambient temperature.

A particularly preferred embodiment of the present invention is the fabrication of films and preimpregnated tape using the polyimide precursor "salt-like" solution of LaRC™ IA. The LaRC™ IA "salt-like" solution is formed from the reaction of oxydiphthalic anhydride (ODPA) dissolved in a mixture of NP and methanol at room temperature. This solution is treated at 60° C. for 3 hours in order to convert the ODPA into ODP-dimethyl ester. Phthalic acid (PA) and 3,4'-oxydianiline (3,4'-ODA) are added to the ODP-dimethyl ester solution and the mixture is stirred for 2 hours to yield a homogenous polyimide precursor "salt-like" solution.

Another particularly preferred embodiment of the present invention is the fabrication of films and preimpregnated tape using the polyimide precursor "salt-like" solution of LaRC™ IAX. The LaRC™ IAX "salt-like" solution is formed from the reaction of oxydiphthalic anhydride (ODPA) dissolved in a mixture of NMP and methanol at room temperature. This solution is treated at 60° C. for 3 hours in order to convert the ODPA into ODP-dimethyl ester. Phthalic acid (PA), and 0.9 moles of 3,4'-oxydianiline (3,4'-ODA) and 0.1 moles of phenylene diamine (PDA) are added to the ODP-dimethyl ester solution and the mixture is stirred for 2 hours to yield a homogenous copolyimide precursor "salt-like" solution.

Another particularly preferred embodiment of the present invention is the fabrication of films and preimpregnated tape using the polyimide precursor "salt-like" solution of LaRC™-8515. The LaRC™-8515 "salt-like" solution is formed from the reaction of biphenylene dianhydride (BPDA) dissolved in a mixture of NMP and methanol at room temperature. This solution is treated at 60° C. for 3 hours in order to convert the BPDA to a biphenyl-dimethyl ester. Phthalic acid (PA), 0.85 moles of 3,4'-oxydianiline (3,4'-ODA) and 0.15 moles of 1,3-bisaminophenoxybenzene (APB) are added to the ODP-dimethyl ester solution and the mixture is stirred for 2 hours to yield a homogenous copolyimide precursor "salt-like" solution.

Yet another particularly preferred embodiment of the present invention is the fabrication of films and preimpregnated tape using the polyimide precursor "salt-like" solution of PETI-5. The "salt-like" solution is formed from the reaction biphenylene dianhydride (BPDA) dissolved in a mixture of NMP and methanol at room temperature. This solution is treated at 60° C. for 3 hours in order to convert the BPDA to a biphenyl-dimethyl ester. Phthalic acid (PA), 0.85 moles of 3,4'-oxydianiline (3,4'-ODA), 0.15 moles of 1,3-bisaminophenoxybenzene (APB) and the endcapper phenylethynyl phthalic anhydride (PEPA) are added to the ODP-dimethyl ester solution and the mixture is stirred for 2 hours to yield a homogenous copolyimide precursor "salt-like" solution.

In another aspect, the present invention is the process of fabricating preimpregnated tape and composites from polyimide precursor "salt-like" solutions.

In yet another respect, the present invention is the process of laminating preimpregnated tape fabricated using polyimide precursor "salt-like" solutions.

Having generally described the invention, a more complete understanding thereof can be obtained by reference to the following examples, which are provided herein for purposes of illustration only and do not limit the invention.

EXAMPLE 1

Biphenylene dianhydride (BPDA) (0.91 moles) was dissolved in a mixture of NMP and methanol at room temperature. This solution was treated at 60° C. for 3 hours in order to convert the BPDA to a biphenyl-dimethyl ester 3,4'-oxydianiline (3,4'-ODA) (0.85 moles), 1,3-bisaminophenoxybenzene (APB) (0.15 moles) and the endcapper phenylethynyl phthalic anhydride (PEPA) (0.18 moles) were added to the BPA-dimethyl ester solution and the mixture was stirred for 12 hours to yield a homogenous, dark brown PETI-5 precursor solution. Solid contents and viscosity of the solution was 60 weight % and 3100 cp respectively.

The precursor solution was coated on a glass plate using an automatic film applicator. After drying at 50° C. and 80° C. for an hour, respectively, the films were thermally cured at 100, 225, and 350° C. for one hour, respectively. The resulting film was removed from the glass plate to yield a transparent film with a thickness of 14 mil.

Tensile strength, elongation and tensile modulus of the resulting film was 13.7 kg,/mm$^2$, 5.5% and 400 kg/mm$^2$.

EXAMPLE 2

Figure 3:
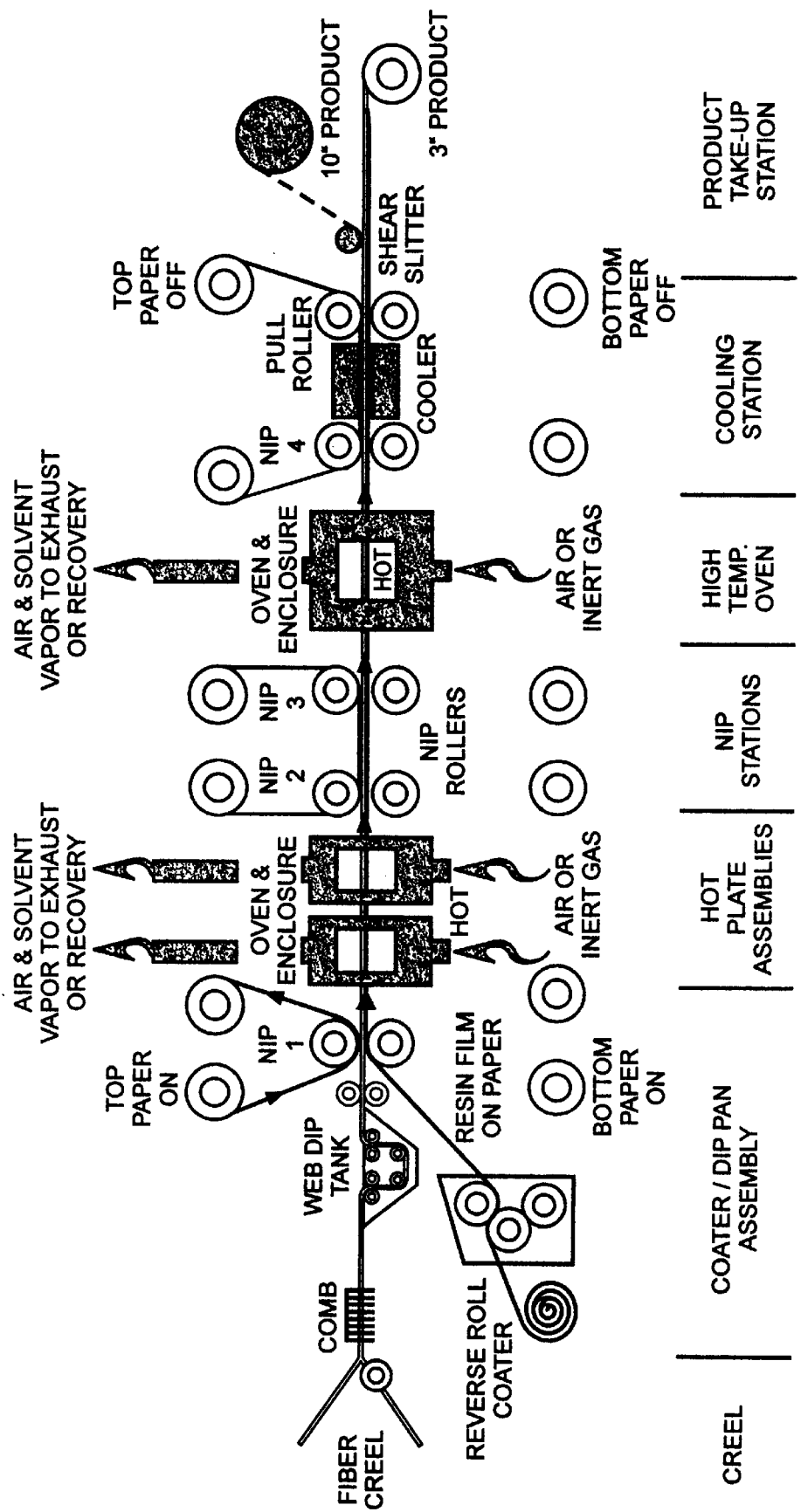
FIG. 3 is a schematic diagram of a Tape Machine's modular components.
Figure 4:
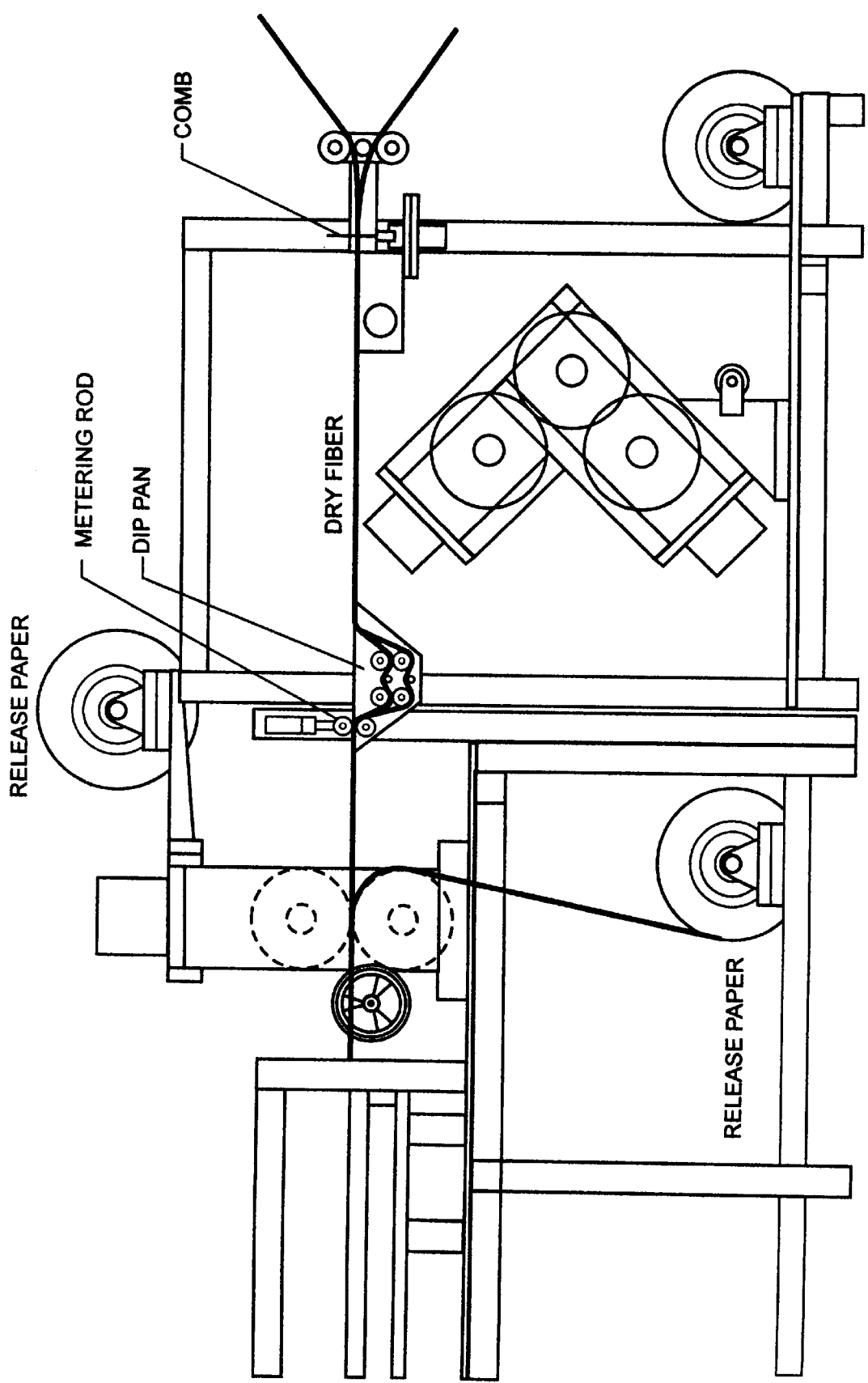
FIG. 4 is a schematic illustration of solution prepregging using the dip tank method.

LaRC™-PETI-5 was placed in the resin dip tank of the LaRC Multipurpose Prepeg Machine (FIGS. 3 and 4). The solution had a solids content of 65% resin by weight in NMP with a Brookfield viscosity of 3000 cp at 20° C. The hotplates were set at 300° F. while the oven was set at 260° F. Nip stations 2, 3, and 4 were utilized with only contact pressure and were set at 200° F. The metering bar gap was set at 0.015 inches and the line speed was set to 1.8 ft/min. The comb was adjusted to attain a fiber aerial weight of 145 g/m$^2$. Seventy ends of 12 k sized Hercules IM7 carbon fiber were utilized. A prepeg, tape with FAW of 145 g/m$^2$, 35.0 wt % dry resin content, and a wet volatile percent of 15 was produced. The 8.5 inch wide prepeg tape was of high quality with excellent wet out, tack and drape.

EXAMPLE 3

LaRC™-8515 "salt-like" solution was placed in the resin dip tank of the LaRC Multipurpose Prepeg Machine (FIGS.

3 and 4). The solution had a solids content of 65% resin by weight in NMP with a Brookfield viscosity of 9660 cp at 18° C. The hotplates were set at 300° F. while the oven was set at 280° F. Nip stations 2, 3, and 4 were utilized with only contact pressure and were set at 200° F. The metering bar gap was set at 0.016 inches and the line speed was set to 2.5 ft/min. The comb was adjusted to attain a fiber aerial weight of 145 g/m$^2$. Seventy ends of 12 k sized Hercules IM7 carbon fiber were utilized. A prepeg tape with FAW of 148 g/m$^2$, 35.7 wt % dry resin content, and a wet volatile percent of 15.0 was produced. The 8.5 inch wide prepeg tape was of high quality with excellent wet out, tack, and drape. A total of 350 linear feet of material was produced.

EXAMPLE 4

LaRC™-IA "salt-like" solution was placed in the resin dip tank of the LaRC Multipurpose Prepeg Machine (FIGS. 3 and 4). The solution had a solids content of 65% resin by weight in NMP with a Brookfield viscosity of 6780 cp at 23° C. The hotplates were set at 300° F. while the oven was set at 260° F. Nip stations 2, 3, and 4 were utilized with only contact pressure and were set at 200° F. The metering bar gap was set at 0.016 inches and the line speed was set to 1.9 ft/min. The comb was adjusted to attain a fiber aerial weight of 145 g/m$^2$. Seventy ends of 12 k sized Hercules IM7 carbon fiber were utilized. A prepeg tape with FAW of 150 g/m2, 37.5 wt % dry resin content, and a wet volatile percent of 13.8 was produced. The 8.5 inch wide prepeg tape was of high quality with excellent wet out, tack, and drape. A total of 350 linear feet of material was produced.

EXAMPLE 5

LaRC™-IAX "salt-like" solution was placed in the resin dip tank of the LaRC Multipurpose Prepeg Machine (FIGS. 3 and 4). The solution had a solids content of 65% resin by weight in NMP with a Brookfield viscosity of 4955 cp at 22° C. The hotplates were set at 300° F. while the oven was set at 280° F. Nip stations 2, 3, and 4 were utilized with only contact pressure and were set at 200° F. The metering bar gap was set at 0.016 inches and the line speed was set to 1.8 ft/min. The comb was adjusted to attain a fiber aerial weight of 145 g/m$^2$. Seventy ends of 12 k sized Hercules IM7 carbon fiber were utilized. A prepeg tape with FAW of 150 g/m2, 34.0 wt % dry resin content, and a wet volatile percent of 13.2 was produced. The 8.5 inch wide prepeg tape was of high quality with excellent wet out, tack, and drape. A total of 350 linear feet of material was produced.

EXAMPLE 6

Figure 5:
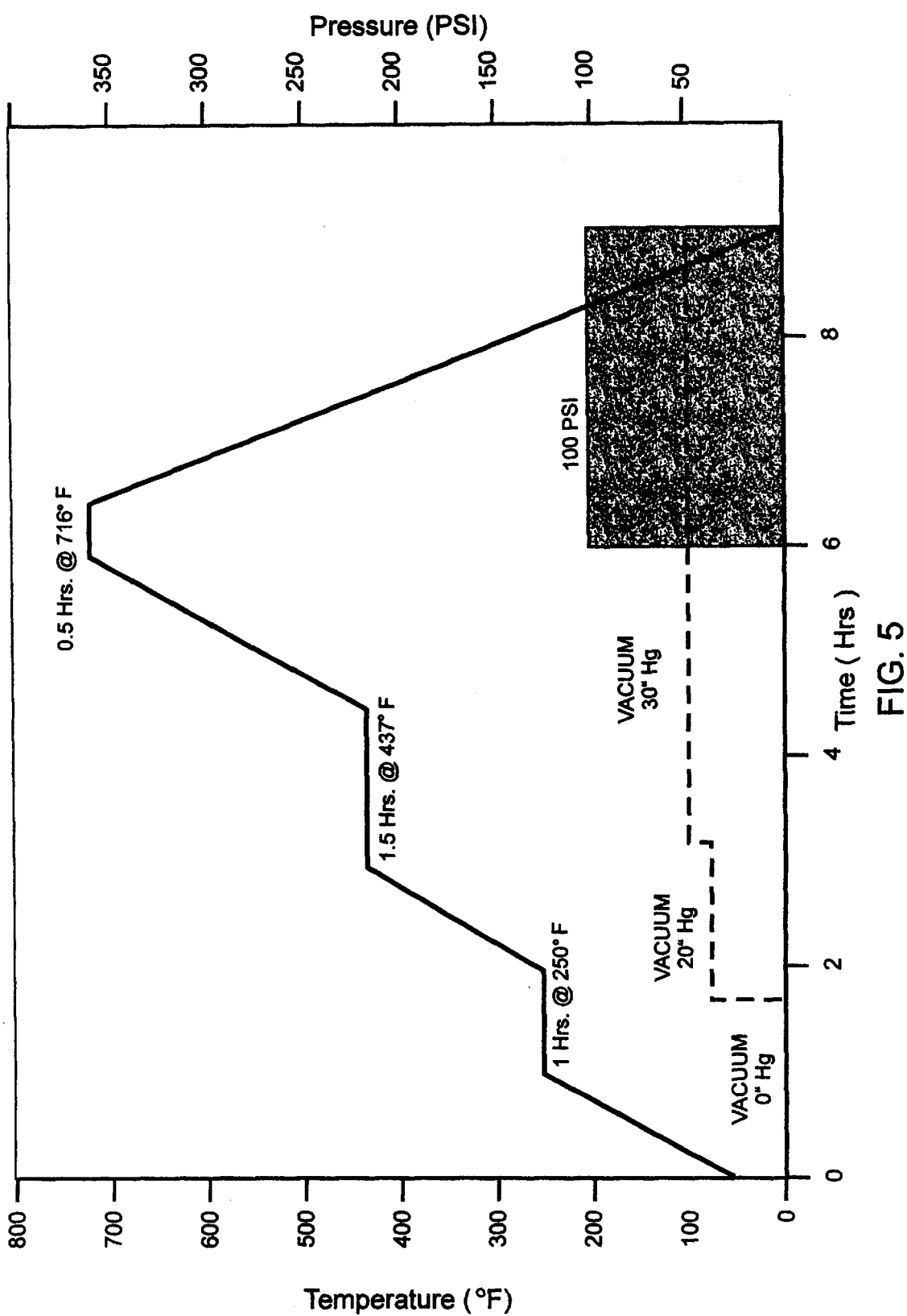
FIG. 5 shows the cure cycle for the polyimide "salt-like" preimpregnated tape according to the present invention.
Figure 6:
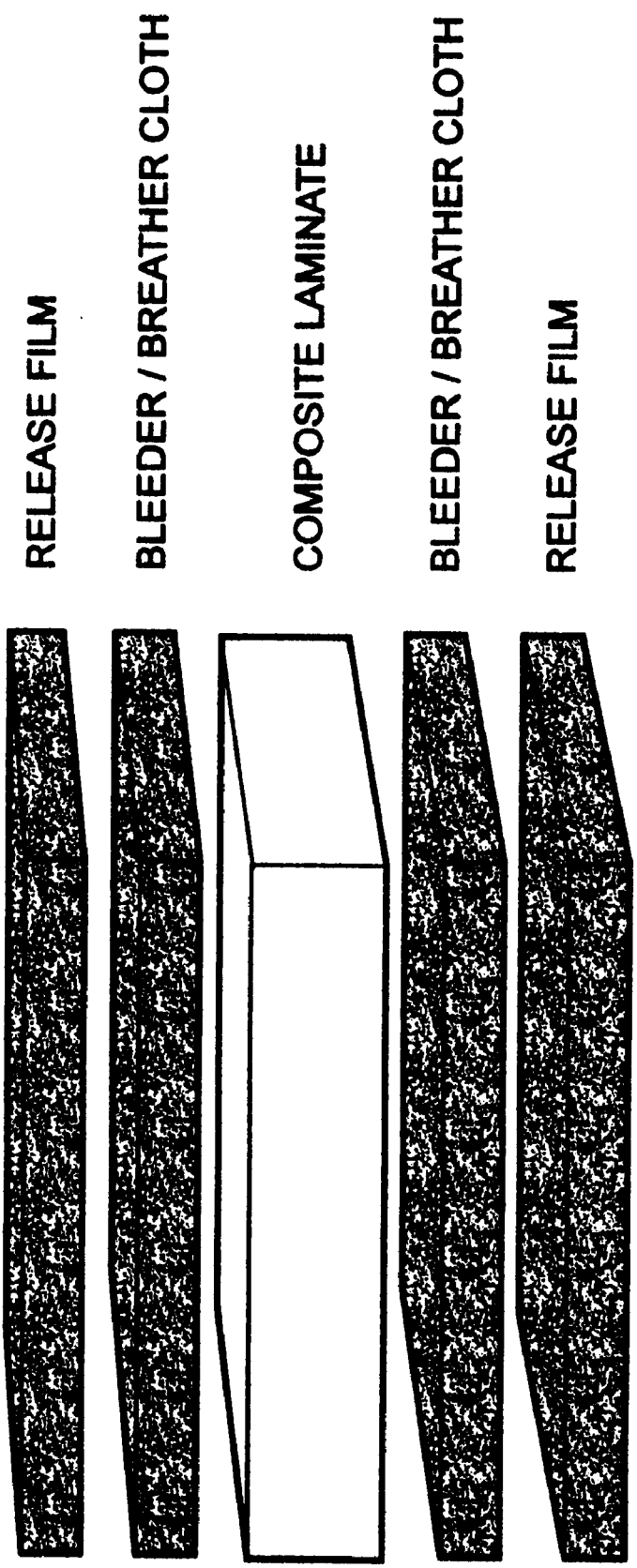
FIG. 6 shows the composite laminate lay-up configuration according to the present invention.

LaRC™-8515 "salt-like" prepeg was processes into various different composite laminates by the process illustrated in FIG. 5. One ply of Kapton™ film and one ply of 0.0025" Teflon bleeder/breather cloth was placed on either side of several plies of LaRC™-85 15 "salt-like" prepeg (see FIG. 6). The material was then placed in a closed mold and processed in a hydraulic vacuum press. The LaRC™-8515 "salt-like" prepeg was heated to 250° F. under isobaric conditions and held for one hour. During the one hour hold, the residual solvent within the material was removed. After 30 minutes at 250° F., 20" Hg of vacuum was applied. Once the 250° F. hold was completed, the material was ramped to 437° F. where an additional 10" Hg was added to allow full vacuum to be present. During the one and half hour hold at 437° F., the material becomes fully imidized. After the hold at 437° F., the LaRC™-8515 polyimide was heated to the final cure temperature of 716° F. At the final cure temperature, 100 psi was applied to the laminate and the material was held at this temperature and pressure for 30 minutes. During this hold, the LaRC™-8515 polyimide becomes amorphous and reaches minimum viscosity which allows for proper consolidation. Once the hold has been completed, the material is cooled to ambient under fill vacuum and 100 psi pressure. At ambient temperature, the mold was removed from the hydraulic vacuum press and the laminate was released from the mold. Upon visual and ultrasonic examination, the laminate was determined to be of excellent quality. The properties for LaRC™-8515/IM-7 "salt-like" composites is given in Table 1 and 2.

TABLE 1

Mechanical Tests And Properties For LaRC ™-8515/IM-7 "Salt-Like" Composites

| Mechanical Test | Test Temperature, ° C. | No Spec. at each Temperature | Failure Load (Kg) | Failure Stress (MTPa) | Modulus (Gpa) |
|---|---|---|---|---|---|
| SBS | RT | 10 | 352.7 ± 12.2 | 117.8 ± 3.8 | N/A |
|  | 177 | 10 | 135.6 ± 9.9 | 45.4 ± 3.0 |  |
| 0° | RT | 6 | 79.9 ± 4.4 | 1725.1 ± 84.1 | 146.9 ± 3.4 |
| Flexural | 177 | 5 | 57.4 ± 2.5 | 1299.0 ± 101.4 | 137.2 ± 9.7 |
| 90° | RT | 5 | 26.4 ± 1.9 | 117.9 ± 6.1 | 4.62 ± 0.28 |
| Flexural | 177 | 5 | 14.2 ± 3.3 | 58.6 ± 13.1 | 4.34 ± 0.28 |

TABLE 2

Mechanical Properties For LaRC ™-8515/IM-7 Composites

| Mechanical Test | Test Temperature, ° C. | Failure Stress (Ksi) |
|---|---|---|
| SBS | RT | 140.65 |
|  | 177 | 75.84 |
| 0° Flexural | RT | 1654.74 ± 64.53 |
|  | 177 | 1061.79 ± 53.09 |
| 90° Flexural | RT | 96.53 ± 4.83 |
|  | 177 | 60.67 ± 5.89 |

EXAMPLE 7

LaRC™-IA "salt-like" prepeg was processed into various different composite laminates by the process illustrated in FIG. 3. One ply of Kapton™ film and one ply of 0.0025" Teflon bleeder/breather cloth was placed on either side of several plies of LaRC™-8515 "salt-like" prepeg (see FIG. 4). The material was then placed in a closed mold and processed in a hydraulic vacuum press. The LaRC™-IA "salt-like" prepeg was heated to 250° F. under isobaric conditions and held for one hour. During the one hour hold, the residual solvent within the material was removed. After 30 minutes at 250° F., 20" Hg of vacuum was applied. Once the 250° F. hold was completed, the material was ramped to 437° F. where an additional 10" Hg was added to allow fill vacuum to be present. During the one and half hour hold at 437° F., the material becomes fully imidized. After the hold at 437° F., the LaRC™-IA polyimide was heated to the final cure temperature of 716° F. At the final cure temperature, 100 psi was applied to the laminate and the material was held at this temperature and pressure for 30 minutes. During this hold, the LaRC™-IA polyimide becomes amorphous and reaches minimum viscosity which allows for proper consolidation. Once the hold has been completed, the material is cooled to ambient under full vacuum and 100 psi pressure. At ambient temperature, the mold was removed from the hydraulic vacuum press and the laminate was released from the mold. Upon visual and ultrasonic examination, the laminate was determined to be of excellent quality.

TABLE 3

Mechanical Tests And Properties For LaRC ™ IA/IM-7 "Salt-Like" Composites

| Mechanical Test | Test Temperature, °C. | No. Spec. at each Temperature | Failure Load (Kg) | Failure Stress (MPa) | Modulus (GPa) |
|---|---|---|---|---|---|
| SBS | RT | 10 | 380.2 ± 16.3 | 125.1 ± 5.4 | N/A |
|  | 177 | 12 | 126.1 ± 3.2 | 41.4 ± 1.0 |  |
| 0° | RT | 5 | 73.4 ± 3.4 | 1589.9 ± 84.8 | 137.2 ± 9.7 |
| Flexural | 177 | 5 | 47.1 ± 3.5 | 1065.9 ± 79.3 | 131.0 ± 6.9 |
| 90° | RT | 5 | 37.74 ± 7.03 | 133.1 ± 17.2 | 4.27 ± 0.34 |
| Flexural | 177 | 5 | 19.01 ± 1.59 | 73.1 ± 5.5 | 3.44 ± 0.29 |

TABLE 4

Mechanical Properties For LaRC ™ IA/IM-7 Composites

| Mechanical Test | Test Temperature, °C. | Failure Stress (Ksi) |
|---|---|---|
| SBS | RT | 115.08 |
|  | 177 | 57.33 |
| 0° Flexural | RT | 1347.8 |
|  | 177 | 908.2 |
| 90° Flexural | RT | 181.2 |
|  | 177 | 131.6 |

EXAMPLE 8

LaRC™-IAX "salt-like" prepeg was processes into various different composite laminates by the process illustrated in FIG. 3. One ply of Kapton™ film and one ply of 0.0025" Teflon bleeder/breather cloth was placed on either side of several plies of LaRC™-8515 "salt-like" prepeg (see FIG. 4). The material was then placed in a closed mold and processed in a hydraulic vacuum press. The LaRC™-IAX "salt-like" prepeg was heated to 250° F. under isobaric conditions and held for one hour. During the one hour hold, the residual solvent within the material was removed. After 30 minutes at 250° F., 20" Hg of vacuum was applied. Once the 250° F. hold was completed, the material was ramped to 437° F. where an additional 10" Hg was added to allow full vacuum to be present. During the one and half hour hold at 437° F., the material becomes fully imidized. After the hold at 437° F., the LaRC™-IAX polyimide was heated to the final cure temperature of 716° F. At the final cure temperature, 100 psi was applied to the laminate and the material was held at this temperature and pressure for 30 minutes. During this hold, the LaRC™-IAX polyimide becomes amorphous and reaches minimum viscosity which allows for proper consolidation. Once the hold has been completed, the material is cooled to ambient under full vacuum and 100 psi pressure. At ambient temperature, the mold was removed from the hydraulic vacuum press and the laminate was released from the mold. Upon visual and ultrasonic examination, the laminate was determined to be of excellent quality.

TABLE 5

Mechanical Tests And Properties For LaRC ™ IAX/IM-7 "Salt-Like" Composites

| Mechanical Test | Test Temperature, °C. | No. Spec. at each Temperature | Failure Load (Kg) | Failure Stress (MPa) | Modulus (GPa) |
|---|---|---|---|---|---|
| SBS | RT | 10 | 313.9 ± 14.1 | 103.3 ± 4.6 | N/A |
|  | 177 | 10 | 118.8 ± 3.6 | 39.1 ± 1.2 |  |
| 0° | RT | 6 | 67.3 ± 2.9 | 1525.1 ± 131.0 | 145.5 ± 12.4 |
| Flexural | 177 | 5 | 45.8 ± 1.5 | 984.6 ± 91.7 | 135.1 ± 9.7 |
| 90° | RT | 5 | 31.71 ± 2.54 | 121.34 ± 11.72 | 4.34 ± 0.28 |
| Flexural | 177 | 5 | 16.83 ± 1.32 | 66.88 ± 4.83 | 3.03 ± 0.28 |

TABLE 6

Mechanical Properties For LaRC ™ IAX/TM-7 Composites

| Mechanical Test | Test Temperature, °C. | Failure Stress (Ksi) |
|---|---|---|
| SBS | RT | 110.81 |
|  | 177 | 55.33 |
| 0° Flexural | RT | 1489.2 |
|  | 177 | 731.8 |
| 90° Flexural | RT | 199.25 |
|  | 177 | 44.13 |

While the invention has been described in terms of its preferred embodiments, those skilled in the art will recognize that the invention can be practiced with modification within the spirit and scope of the appended claims.

We claim:

1. A preimpregnated tape produced from aromatic polyimide precursor solutions wherein the solution has a solids content between 50 and 80%, a volatile content less than 35% and a Brooksfield viscosity between 4,000 and 10,000 cp at ambient temperatures.

2. The preimpregnated tape of claim 1 wherein the polyimide precursor solution comprises oxydiphthalic anhydride (ODPA), phthalic acid (PA) and 3,4'-oxydianiline (3,4'-ODA).

3. The preimpregnated tape of claim 1 wherein the polyimide precursor solution comprises oxydiphthalic anhydride (ODPA), phthalic acid (PA), 3,4'-oxydianiline (3,4'-ODA) and phenylene diamine (PDA).

4. The preimpregnated tape of claim 1 wherein the polyimide precursor solution comprises biphenylene anhydride (BP), phthalic acid (PA), 3,4'-oxydianiline (3,4'-ODA) and 1,3-bisaminophenoxybenzene (APB).

5. The preimpregnated tape of claim 1 wherein the polyimide precursor solution comprises biphenylene anhydride (BP), phthalic acid (PA), 3,4'-oxydianiline (3,4'-ODA), 1,3-bisaminophenoxybenzene (APB) and phenylethynyl phthalic anhydride (PEPA).

6. A film produced from aromatic polyimide precursor solutions wherein the solution has a solids content between 50 and 80%, a volatile content less than 35% and a Brooksfield viscosity between 4,000 and 10,000 cp at ambient temperatures.

7. The film of claim 6 wherein the polyimide precursor solution comprises oxydiphthalic anhydride (ODPA), phthalic acid (PA) and 3,4'-oxydianiline (3,4'-ODA).

8. The film of claim 6 wherein the polyimide precursor solution comprises oxydiphthalic anhydride (ODPA), phthalic acid (PA), 3,4'-oxydianiline (3,4'-ODA) and phenylene diamine (PDA).

9. The film of claim 6 wherein the polyimide precursor solution comprises biphenylene dianhydride (BPDA), phthalic acid (PA), 3,4'-oxydianiline (3,4'-ODA) and 1,3-bisaminophenoxybenzene (APB).

10. The film of claim 6 wherein the polyimide precursor solution comprises biphenylene dianhydride (BPDA), phthalic acid (PA), 3,4'-oxydianiline (3,4'-ODA), 1,3-bisaminophenoxybenzene (APB) and phenylethynyl phthalic anhydride (PEPA).

11. The process of fabricating preimpregnated tape from polyimide precursor solutions, wherein the solution has a solids content between 50 and 80%, a volatile content less than 35% and a Brookfield viscosity between 4,000 and 10,000 cp at ambient temperatures, comprising the steps of:

(a) placing the polyimide precursor solution in a resin dip tank, (b) running collimated reinforcing fibers over a set of impregnation bars within the resin dip tank, (c) metering excess resin though a gap between a set of metering bars to between 0.0010–0.0025 inches, (d) devolatizing the resin with a heat source, (e) running the preimpregnated tape over a series of heated nip rollers, (f) taking up a final preimpregnated product on a take-up spool.

12. A process for laminating the polyimide preimpregnated tape of claim 1 comprising the steps of:

(a) encapsulating the polyimide preimpregnated tape with a release film and a bleeder cloth, (b) elevating the encapsulated material to remove residual volatiles under partial vacuum of less than 30" Hg, (c) heating the encapsulated material to fully imidize the system, (d) applying full vacuum and pressure to the encapsulated material, (e) heating to ensure full consolidation of the encapsulated material, (f) and cooling to ambient conditions.

13. A composite prepared from the preimpregnated tape of claim 1.

14. A composite prepared from the preimpregnated tape of claim 2.

15. A composite prepared from the preimpregnated tape of claim 3.

16. A composite prepared from the preimpregnated tape of claim 4.

17. A composite prepared from the preimpregnated tape of claim 5.

* * * * *